3,222,253
ANTIMITOTIC COLCHICINES

Albert Eschenmoser, Zollikon, Richard Schindler, Bern, and Jakob Schreiber, Zurich, Switzerland, assignors to Ciba Corporation, New York, N.Y., a corporation of Delaware
No Drawing. Filed May 16, 1962, Ser. No. 195,299
Claims priority, application Switzerland, May 26, 1961, 6,146/61; Mar. 23, 1962, 3,531/62
11 Claims. (Cl. 167—78)

The present invention provides new antimitotic preparations containing des-(acetylamino)-colchicine (I) or des-(acetylamino)-isocolchicine (II) of the formulae

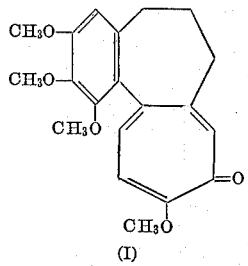

and

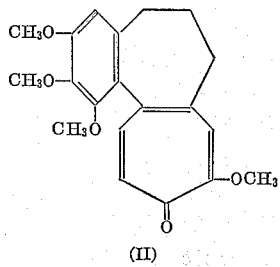

or a mixture of the two compounds as active constituent.

The new preparations have a cystostatic and antimitotic effect. They inhibit cell division by preventing the formation of the spindle (metaphase) during the process of nucleus division. They can therefore be used as medicaments in veterinary medicine, for example, for treating various types of carcinoma. Preparations containing des-(acetylamino) - colchicine or des - (acetylamino)-isocolchicine can also be used in the cultivation of plants for the production of polyploid plants.

The preparation of des-(acetylamino)-colchicine and des-(acetylamino)-isocolchicine has been described in Helv. Chim. Acta 44, page 540 et seq. [1961], but at this stage nothing is known concerning the action developed by these compounds. Particularly active are those preparations which contain des-(acetylamino)-colchicine as active ingredient.

The new preparations are made in known manner, by compounding the active principle with a suitable vehicle. Suitable vehicles are organic or inorganic, solid or liquid substances, preferably such as do not react with the active principle. Suitable pharmaceutical excipients are those which are suitable for enteral, for example oral, parenteral or local administration, such, for example as water, alcohol, gelatine, lactose, starches, stearyl alcohol, magnesium stearate, talc, vegetable oils, benzyl alcohols, gums, propylene glycol, polyalkylene glycols, white petroleum jelly, cholesterol or other known medicinal excipients. The pharmaceutical preparations may be, for example, tablets, drages, ointments, creams or capsules, or in liquid form solutions, suspensions or emulsions. They may be sterilized and/or may contain assistants, such as preserving, stabilising, wetting or emulsifying agents, solution promoters or salts for regulating the osmotic pressure, or buffers. They may further contain other therapeutically valuable substances. For use in veterinary medicine the new preparations may also be admixed with animal fodder.

The pharmaceutical preparations destined for use in medicine advantageously contain about 0.01 to 0.5 mg., more especially 0.05 to 0.1 mg., of the active principle per dosage unit.

The amount of vehicle may vary within wide limits and depends primarily on the form in which the active substance is administered.

The daily dose depends on the form of administration and on the specific need.

For the production of polyploid plants the preparations, may be, for example, in solid form or a solution, suspension or emulsion. The conventional vehicles may be used, for example water, agar, glycerol or lanolin. If desired, the preparations may further contain assistants, such as preserving, stabilising, wetting or emulsifying agents. They may also contain further substances suitable for plant cultivation. Preparations in liquid form may be used, for example, for spraying the plants. Preparations in salve form can be applied to the plant as they are. According to another method of application, for example, the plant is brushed with a solution containing the active principle or it may be immersed in such a solution. The dosage and the period of time for which the preparation is allowed to take effect vary with the way in which it is applied and with the type of plant to be treated. Since in general the toxicity towards plants is inferior to that towards humans and animals, correspondingly higher doses are permissible.

The following examples illustrate the invention without restricting its scope thereto.

Example 1

Tablets containing des-(acetylamino)-colchicine as active ingredient can be prepared in usual manner from:

|  | Mg. |
|---|---|
| Des-(acetylamino)-colchicine | 0.1 |
| Lactose | 70.9 |
| Gelatine | 1.5 |
| Wheat starch | 35 |
| Arrowroot | 12 |
| Magnesium stearate | 0.2 |
| Talc | 5.3 |
| Total | 125.0 |

Example 2

Tablets containing 0.1 of the dose of active principle specified in Example 1 can be prepared in the usual manner from:

|  | Mg. |
|---|---|
| Des-(acetylamino)-colchicine | 0.01 |
| Lactose | 70.99 |
| Gelatine | 1.5 |
| Wheat starch | 35 |
| Arrowroot | 12 |
| Magnesium stearate | 0.2 |
| Talc | 5.3 |
| Total | 125.0 |

Example 3

Des-(acetylamino)-colchicine is made up in the usual manner into an ointment of the following composition:

| | Grams |
|---|---|
| Des-(acetylamino)-colchicine | 0.01 |
| Propylene glycol | 10 |
| Sodium lauryl sulphonate | 2 |
| Phenyl mercury nitrate | 0.002 |
| Cetyl alcohol | 15 |

Water to make 100 grams.

Example 4

An ointment containing less of the active principle than the one described in Example 3 can be prepared, for example from:

| | Grams |
|---|---|
| Des-(acetylamino)-colchicine | 0.001 |
| Propylene glycol | 10 |
| Sodium lauryl sulphonate | 2 |
| Phenyl mercury nitrate | 0.002 |
| Cetyl alcohol | 15 |

Water to make 100 grams.

Example 5

Tablets containing des-(acetylamino)-isocolchicine as active principle may be prepared in the usual manner from:

| | Mg. |
|---|---|
| Des-(acetylamino)-isocolchicine | 0.1 |
| Lactose | 70.9 |
| Gelatine | 1.5 |
| Wheat starch | 35.0 |
| Arrowroot | 12.0 |
| Magnesium stearate | 0.2 |
| Talc | 5.3 |
| Total | 125.0 |

Example 6

Des-(acetylamino)-isocolchicine is made up in the usual manner into an ointment of the following composition:

| | G. |
|---|---|
| Des-(acetylamino)-isocolchicine | 0.001 |
| Propylene glycol | 10.0 |
| Sodium lauryl sulphonate | 2.0 |
| Phenyl mercury nitrate | 0.002 |
| Cetyl alcohol | 15.0 |

Water to make 100 g.

What is claimed is:

1. A pharmaceutical preparation consisting essentially about 0.05 to 0.5 mg. per dosage unit of a member selected from the group consisting of des-(acetylamino)-colchicine (I), des-(acetylamino)-isocolchicine (II) and a mixture of these compounds, and an inert pharmaceutical carrier, the ratio of active ingredient to inert pharmaceutical carrier being in the ratio of 1,250 to 100,000 parts of inert pharmaceutical carrier per part active ingredient.

2. A pharmaceutical preparation consisting essentially about 0.05 to 0.5 mg. per dosage unit of des-(acetylamino)-isocolchicine of the formula

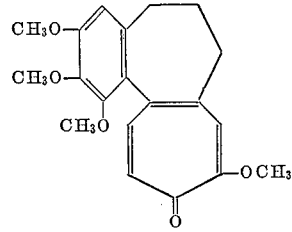

and an inert pharmaceutical carrier, the ratio of active ingredient to inert pharmaceutical carrier being in the ratio of 1,250 to 100,000 parts of inert pharmaceutical carrier per part active ingredient.

3. A pharmaceutical preparation consisting essentially about 0.05 to 0.5 mg. per dosage unit of des-(acetylamino)-colchicine of the formula

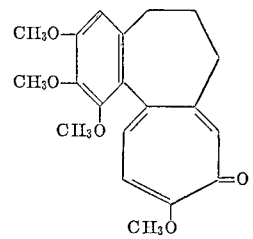

and an inert pharmaceutical carrier, the ratio of active ingredient to inert pharmaceutical carrier being in the ratio of 1,250 to 100,000 parts of inert pharmaceutical carrier per part active ingredient.

4. A pharmaceutical preparation as claimed in claim 1 containing 0.05 to 0.1 mg. of the active compound per dosage unit.

5. A pharmaceutical preparation as claimed in claim 3 containing 0.05 to 0.1 mg. of the active compound per dosage unit.

6. An animal feed composition comprising an effective amount of a member selected from the group consisting of des-(acetylamino)-colchicine, des-(acetylamino)-isocolchicine and a mixture of the two compounds, and animal fodder.

7. An animal feed composition comprising an effective amount of des-(acetylamino)-colchicine, and animal fodder.

8. An animal feed composition comprising an effective amount of des-(acetylamino)-isocolchicine, and animal fodder.

9. A process for the production of a polyploid plant which comprises administering to a plant, an agent comprising an effective amount of a member selected from the group consisting of des-(acetylamino)-colchicine, des-(acetylamino)-isocolchicine and a mixture of the two compounds.

10. A process for the production of a polyploid plant which comprises administering to a plant, an agent comprising an effective amount of des-(acetylamino)-colchicine.

11. A process for the production of a polyploid plant which comprises administering to a plant, an agent comprising an effective amount of des-(acetylamino)-isocolchicine.

References Cited by the Examiner

UNITED STATES PATENTS

| 2,734,014 | 2/1956 | Bellet et al. | 71—2.3 X |
| 2,778,721 | 1/1957 | Bellet | 71—2.3 X |
| 2,939,870 | 6/1960 | Muller et al. | 71—2.5 X |
| 2,950,311 | 8/1960 | Muller et al. | 71—2.3 X |
| 3,082,226 | 3/1963 | Sigg | 167—65 |

OTHER REFERENCES

Colsky et al.: Arch. of Int. Md., volume 100, 1957, page 765.

Cortini: Chem. Abst., volume 52, page 9319, 1958.

Lessmann et al.: J. Am. Med. Assoc., volume 175, No. 9, March 4, 1961, pages 741–750.

Molinatti et al.: Excerpta Medica, volume 5, Sect. 16, Cancer, 1957, Abst. 1280, page 300.

Oettel: Chem. Abst., volume 52, page 573, 1958.

Russian, Farmakologiia i Toksikologiia, vol. 20, No. 3 1957, page 70.

Schriber et al.: Helv. Chim. Acta 44, pages 540 to 597 (pages 540, 541, 559, 591 particularly relied on).

Van Tamelen et al.: J. Am. Chem. Soc., volume 81, pages 6341–6342, 1959.

JULIAN S. LEVITT, *Primary Examiner.*

FRANK CACCIAPAGLIA, JR., LEWIS GOTTS,
*Examiners.*